(12) United States Patent
Park et al.

(10) Patent No.: US 8,249,367 B2
(45) Date of Patent: Aug. 21, 2012

(54) APPARATUS AND METHOD FOR ENCODING AN IMAGE FOR A MOBILE TELECOMMUNICATION HANDSET

(75) Inventors: Won-Bae Park, Gyeonggi-Do (KR); Tae-Ik Kang, Gyeonggi-Do (KR); Alecksandr L. Maiborda, St. Petersburg (RU); Sergey N. Gramnitsky, St. Petersburg (RU); Alexandr V. Ivanov, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 957 days.

(21) Appl. No.: 11/394,468

(22) Filed: Mar. 30, 2006

(65) Prior Publication Data
US 2006/0239565 A1    Oct. 26, 2006

(30) Foreign Application Priority Data
Mar. 31, 2005    (KR) .................. 10-2005-0027348

(51) Int. Cl.
*G06K 9/36* (2006.01)
*G06K 9/00* (2006.01)
(52) U.S. Cl. ..................... 382/232; 382/251
(58) Field of Classification Search ............. 382/239, 382/240
See application file for complete search history.

(56) References Cited

U.S. PATENT DOCUMENTS

| | | | | |
|---|---|---|---|---|
| 5,212,742 A * | 5/1993 | Normile et al. | ........... | 382/166 |
| 6,768,819 B2 * | 7/2004 | Yamazaki et al. | ........... | 382/240 |
| 7,016,545 B1 * | 3/2006 | Schwartz et al. | ........... | 382/239 |
| 7,076,104 B1 * | 7/2006 | Keith et al. | ........... | 382/233 |
| 7,437,010 B2 * | 10/2008 | Budge et al. | ........... | 382/239 |
| 2002/0118884 A1 * | 8/2002 | Cho et al. | ........... | 382/238 |
| 2003/0160900 A1 * | 8/2003 | Dumitras et al. | ........... | 348/649 |
| 2003/0198391 A1 * | 10/2003 | Fukuhara et al. | ........... | 382/232 |
| 2004/0013310 A1 * | 1/2004 | Suino et al. | ........... | 382/240 |
| 2004/0197025 A1 * | 10/2004 | Okamoto | ........... | 382/240 |
| 2004/0202375 A1 * | 10/2004 | Kalevo | ........... | 382/239 |
| 2005/0265613 A1 * | 12/2005 | Fukuhara et al. | ........... | 382/239 |

OTHER PUBLICATIONS

Arora, N., "Wavelet Based Image Compression," Published to personal website Sep. 3, 2003. Accessed at http://www.cs.nyu.edu/~nitin/minip/report.html on Dec. 2, 2009.*
Yan Ye; Cosman, P., "Fast and memory efficient text image compression with JBIG2," Image Processing, IEEE Transactions on , vol. 12, No. 8, pp. 944-956, Aug. 2003.*

* cited by examiner

Primary Examiner — Bhavesh Mehta
Assistant Examiner — Nirav G Patel
(74) Attorney, Agent, or Firm — Lee, Hong, Degerman, Kang & Waimey

(57) ABSTRACT

There are provided an apparatus and a method for encoding an image for a mobile telecommunication handset. The image is divided into the stripe blocks and the number of the phase of wavelet transform is determined depending on the size of the image. The divided image stripe block is wavelet-transformed depending to the determined number of the phase. The wavelet-transformed high-frequency components is granular-quantized and the wavelet-transformed low-frequency components is DPCM-encoded. Thus, computing load and memory capacity can be lessened, maintaining the image of good quality in the mobile telecommunication handset.

15 Claims, 6 Drawing Sheets

SPLIT INTO STRIPES

FIRST PHASE OF WAVELET TRANSFORM

SECOND PHASE OF WAVELET TRANSFORM

THIRD PHASE OF WAVELET TRANSFORM

US 8,249,367 B2

APPARATUS AND METHOD FOR ENCODING AN IMAGE FOR A MOBILE TELECOMMUNICATION HANDSET

CROSS REFERENCE TO RELATED APPLICATIONS

Pursuant to 35 U.S.C. §119(a), this application claims the benefit of earlier filing date and right of priority to Korean Patent Application No. 10-2005-0027348, filed on Mar. 31, 2005, the content of which is hereby incorporated by reference herein in its entirety.

BACKGROUND OF THE INVENTION

1. Field of the Invention

The present invention relates to an encoding of an image (an image signal) for a mobile communication handset, more particularly to an apparatus and a method for encoding an image (an image signal) for a mobile communication handset, capable of the image being divided into image stripes and the image stripes being encoded based on a combination of a wavelet coding and a differential pulse coding modulation (DPCM)

2. Description of the Background Art

Recently, requests have been increased for transmission of multimedia signals including a voice signal and an image signal in a mobile telecommunication system. The multimedia signal, especially the image signal has a large amount of data. The limited resource of channels for wireless transmission of the image signal with a large amount of data requires reduction of the amount of data to be transmitted wirelessly. This calls for a method for encoding an image, which allows the mobile telecommunication handset to lessen computing load and memory capacity, maintaining the image of good quality, in shooting a picture or moving pictures and storing the picture or the moving pictures or transmitting the pictures or the moving pictures, or in receiving the image with the large amount of data.

BRIEF DESCRIPTION OF THE INVENTION

Therefore, an object of the present invention is to provide an apparatus and a method for splitting an image for a mobile telecommunication handset into image stripes and encoding the image stripes.

Another object of the present invention is to provide an apparatus and a method for transform image stripes into wavelet blocks, categorizing the transformed wavelet blocks into high frequency wavelet blocks and low frequency wavelet block and encoding the high frequency wavelet blocks and the low frequency wavelet blocks in their respective ways.

To achieve these and other advantages and in accordance with the purpose of the present invention, as embodied and broadly described herein, there in provided an apparatus for encoding an image for a mobile telecommunication handset, comprising a splitter configured to split the input image into stripes; and an encoder configured to encode the stripes which is divided as least two frequency parts.

To achieve these and other advantages and in accordance with the purpose of the present invention, as embodied and broadly described herein, there is provided an apparatus for encoding an image for a mobile telecommunication handset, including a stripe splitter splitting an input image into stripes and stripe encoder transforming the split image stripes into wavelets, categorizing the wavelet-transformed image stripes into a high frequency wavelet blocks and a low frequency wavelet blocks and encoding the high frequency wavelet blocks and the low frequency wavelet blocks in their respective ways.

A granular quantization of the high frequency wavelet blocks may be made and the low frequency may be encoded with the DPCM process.

There is also provided a method for encoding an image for a mobile telecommunication handset, including splitting an input image into image stripes, transforming the split image stripes into wavelets, categorizing the wavelet-transformed image stripes into a high frequency wavelet blocks and a low frequency wavelet blocks, and quantizing the high frequency wavelet blocks and encoding the low frequency wavelet blocks.

The quantization of the high frequency wavelet blocks may include a granular quantization and the encoding of the low frequency wavelet blocks may include an encoding by the DPCM process.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

According to the present invention, an image is split into stripe blocks and is encoded. More specifically, the image is split into stripe blocks and the split image stripes are transformed into wavelets depending on the number of the phase of wavelet transform which is set based on a size of the image. A granular quantization of wavelet-transformed high frequency components is made and wavelet-transformed low frequency components are encoded with DPCM process.

Figure 1:
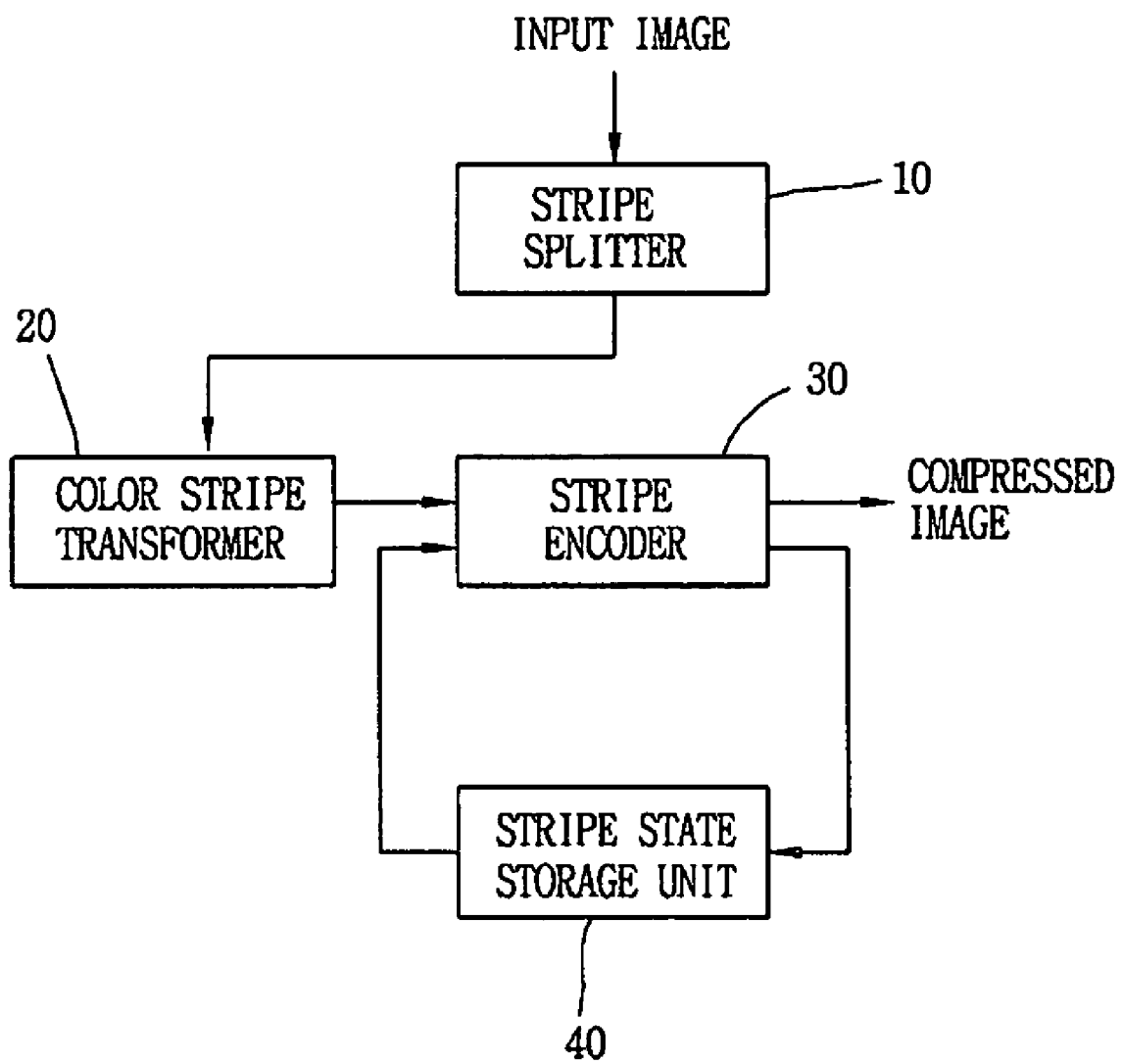
FIG. 1 is a drawing illustrating a configuration of an apparatus for encoding an image for a mobile communication handset.

FIG. 1 shows a configuration of an apparatus for encoding an image for a mobile telecommunication handset.

As shown in FIG. 1, an apparatus for encoding an image for a mobile telecommunication handset includes a stripe splitter 10 splitting an input image into stripes, a color stripe transformer 20 transforming the split image stripes from RGB (red green blue) color space to YUV color space, a stripe encoder 30 performing a wavelet transform of the image stripes output from the color stripe transformer 20, categorizing the wavelet-transformed image into wavelet high-frequency components and the wavelet low-frequency components and encoding the wavelet high-frequency components and low-frequency components in their respective ways, and a stripe-state storage unit 40 storing information necessary to encode the image on a stripe block basis.

The stripe encoder 30 may perform a granular quantization of the wavelet high-frequency to become granular quanta and encode the wavelet low-frequency components with DPCM process.

Figure 2:
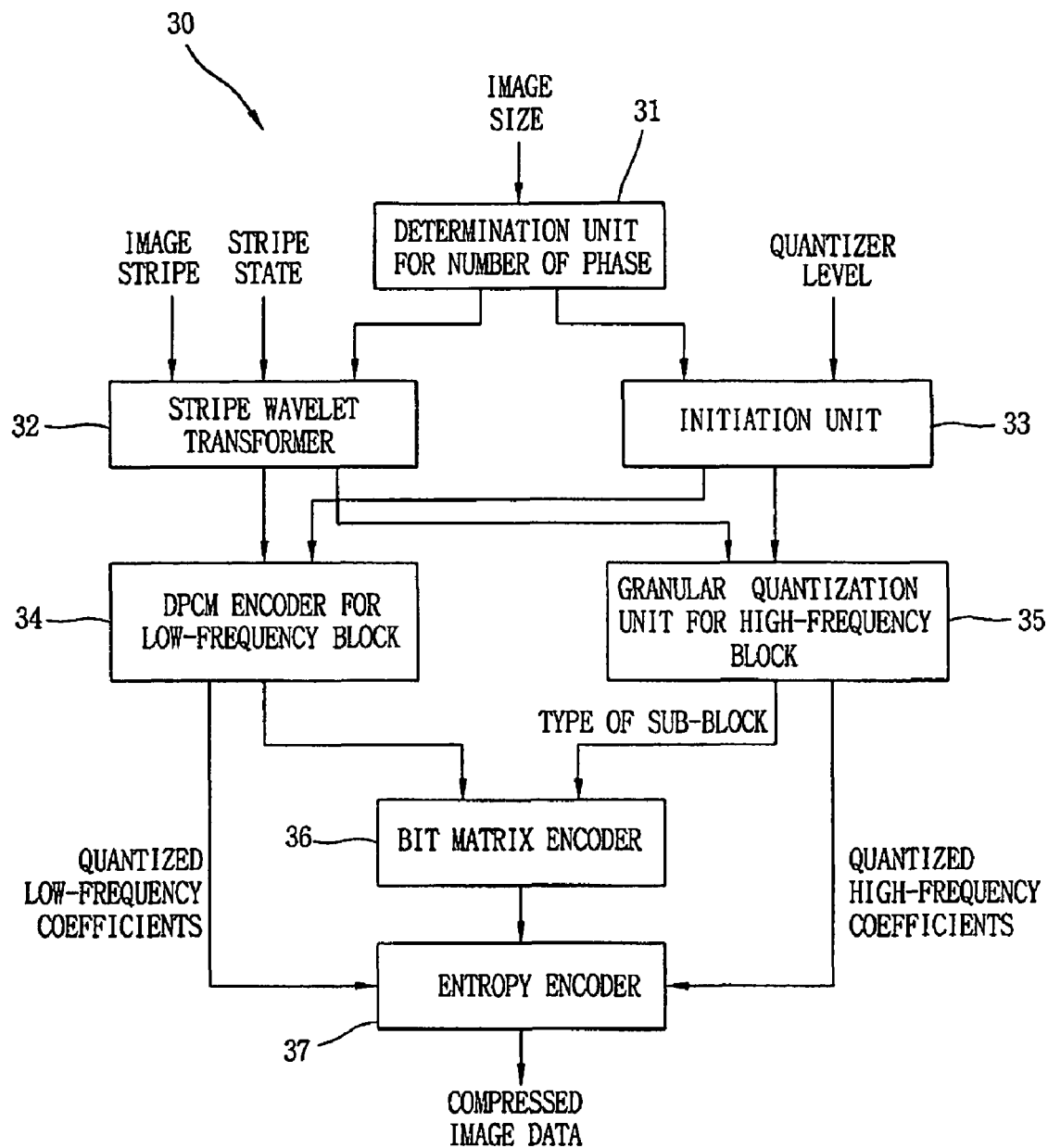
FIG. 2 is a drawing illustrating a configuration of a stripe encoder according to the present invention.

Referring to FIG. 2, the stripe encoder 30 will be below described.

The stripe encoder 30 include a determination unit 31 determining the number of the phase of wavelet transform depending on a size of the image, a stripe wavelet transformer 32 performing a wavelet transform of the input image stripes depending on the determined number of the phase of wavelet transform and outputting the low-frequency wavelet blocks (the wavelet low-frequency components) and the high-frequency wavelet blocks (the wavelet high-frequency components), an initiation unit 33 initializing a quantization unit provided to quantize wavelet coefficients, a DPCM encoder 34 encoding the low-frequency wavelet blocks with the DPCM process, a quantization unit 35 making a granular quantization of the high-frequency wavelet blocks, a bit matrix encoder 36 encoding bit-matrix obtained from the DPCM encoder 34, and an entropy encoder 37 compress the quantized low-frequency coefficients output from the DPCM encoder 34 and the quantized high-frequency coefficients output from the quantization unit 35, using entropy coding.

Using Huffman coding, the entropy encoder 37 may compress the quantized low-frequency coefficients output form the DPCM encoder 34 and the quantized high-frequency coefficients output form the quantization unit 35.

Figure 3:
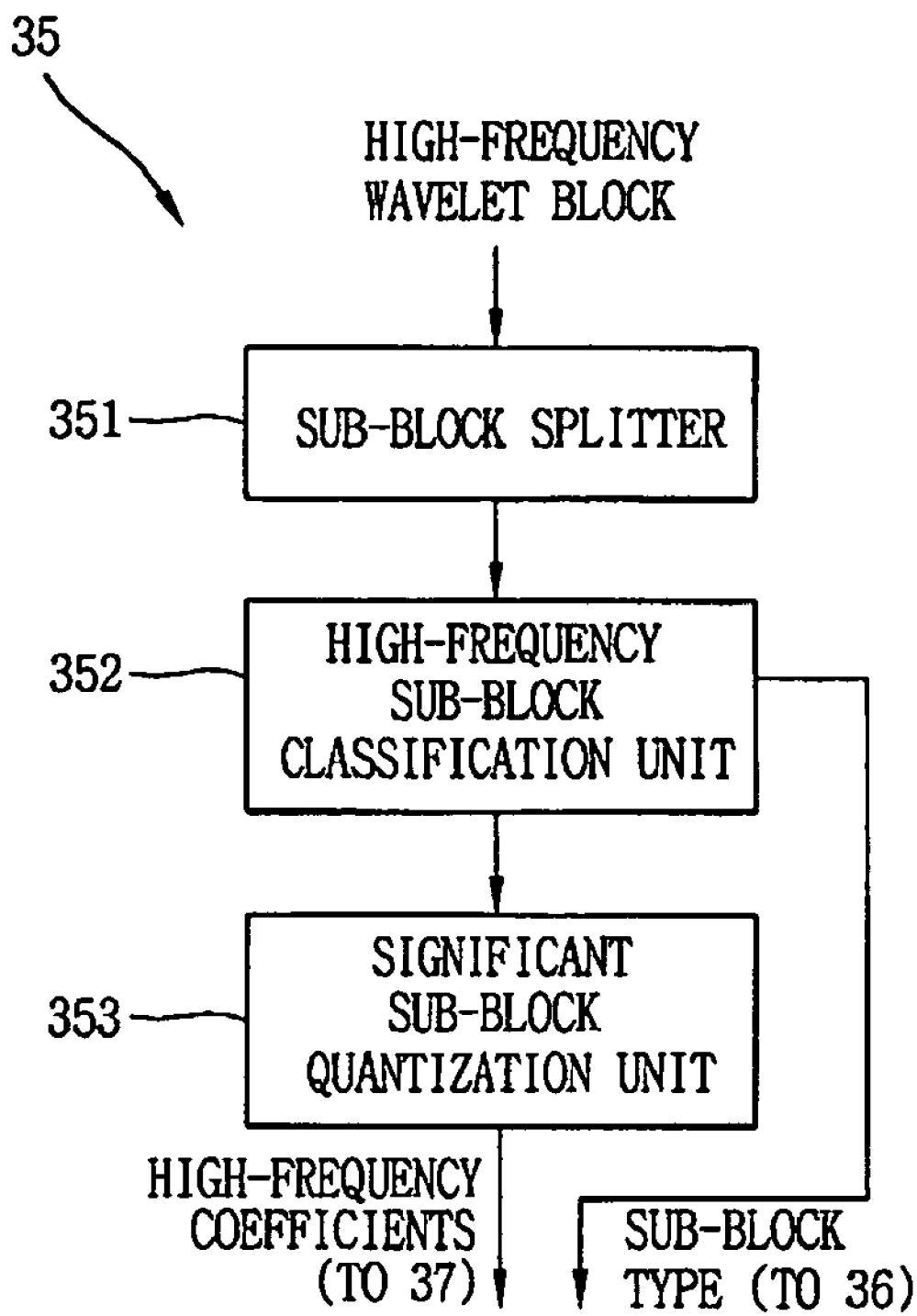
FIG. 3 is a drawing illustrating a configuration of a quantization unit quantizing a high-frequency blocks according to the present invention.

The quantization unit 35, as shown in FIG. 3, includes a sub-block splitter 351 splitting the high-frequency blocks into sub-blocks, a high-frequency sub-block classification unit 352 classifying the sub-blocks into significant sub-blocks and insignificant sub-blocks and outputting types of the sub-blocks to the bit matrix encoder 36 in a form of bit matrix and a significant sub-block quantization unit 353 making a scalar quantization of the significant sub-blocks and outputting the scalar-quantized significant sub-blocks to the entropy encoder 37.

The sub-block, for example, represent 4 pixels in a form of 2×2.

Figure 4:
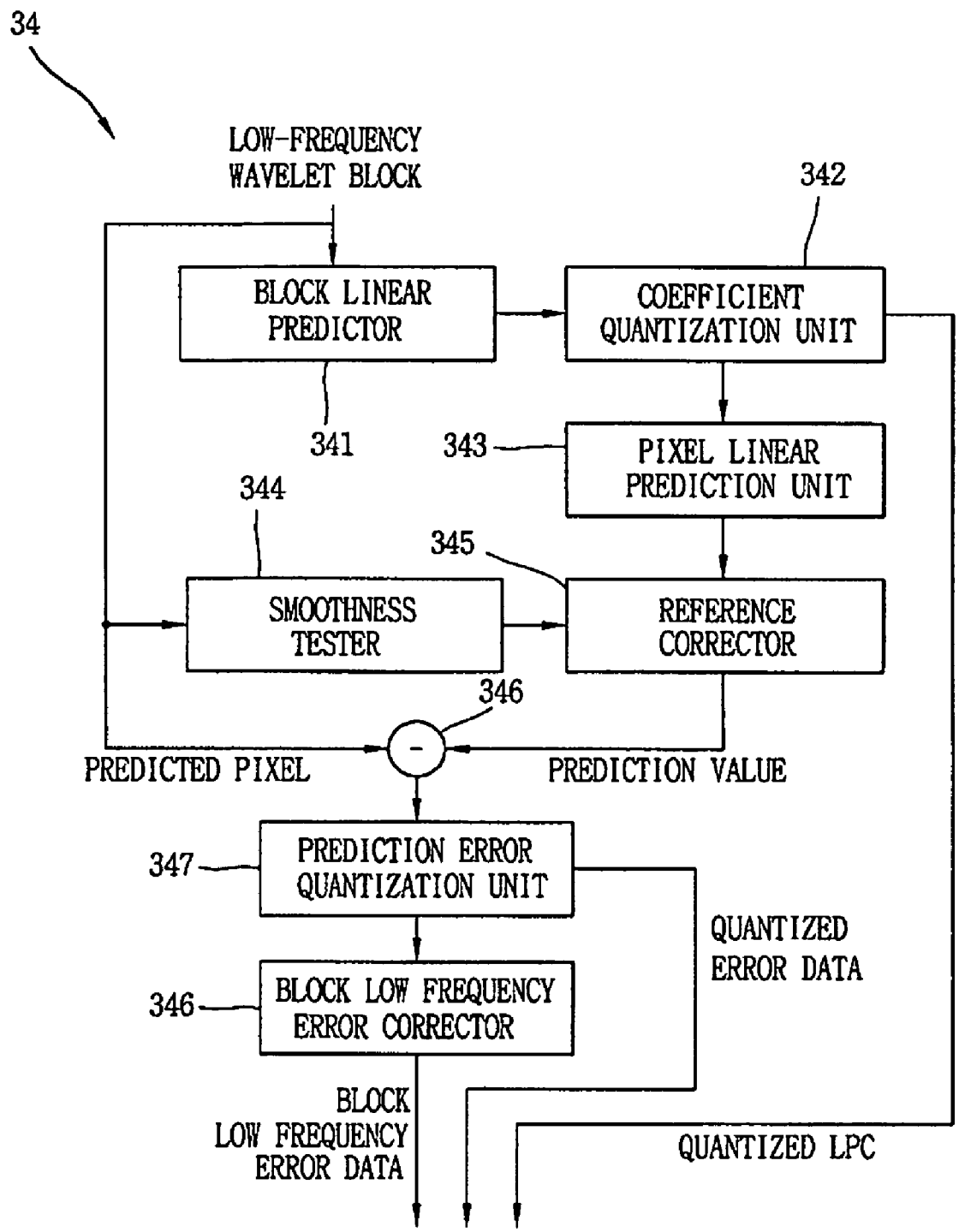
FIG. 4 is a drawing illustrating a configuration of an encoder for low frequency blocks according to the present invention.

The DPCM encoder 34, as shown in FIG. 4. includes a linear prediction unit 341 calculating optimal linear prediction coefficients (LPC) of the low-frequency wavelet block, a coefficient-quantization unit 342 making a scalar quantization of the linear prediction coefficients and outputting the scalar-quantized linear prediction coefficients to the entropy encoder 37, a linear prediction unit 343 calculating a linear prediction value of a current pixel using the scalar-quantized linear prediction coefficients, a smoothness tester 344 testing if the vicinity of pixel to be encoded is smooth, a reference corrector 345 correcting the linear prediction value of the current pixel calculated by the linear prediction unit 343 depending on a control of the smoothness tester 344, when the vicinity of the pixel to be encoded is not smooth, a subtracting unit 346 calculating a difference between a current pixel value of the low-frequency wavelet block and the linear prediction value output from the reference corrector 345 and outputting the difference as the prediction error, the prediction error quantization unit 347 making a scalar quantization of the prediction error and outputting the scalar-quantized prediction error to the bit matrix encoder 36 in a bit matrix form, and a block low-frequency error corrector 348 correcting the low-frequency component of the quantized block error.

Below is described the operation of the apparatus for encoding the image for the mobile communication handset according to the present invention.

Figure 5:
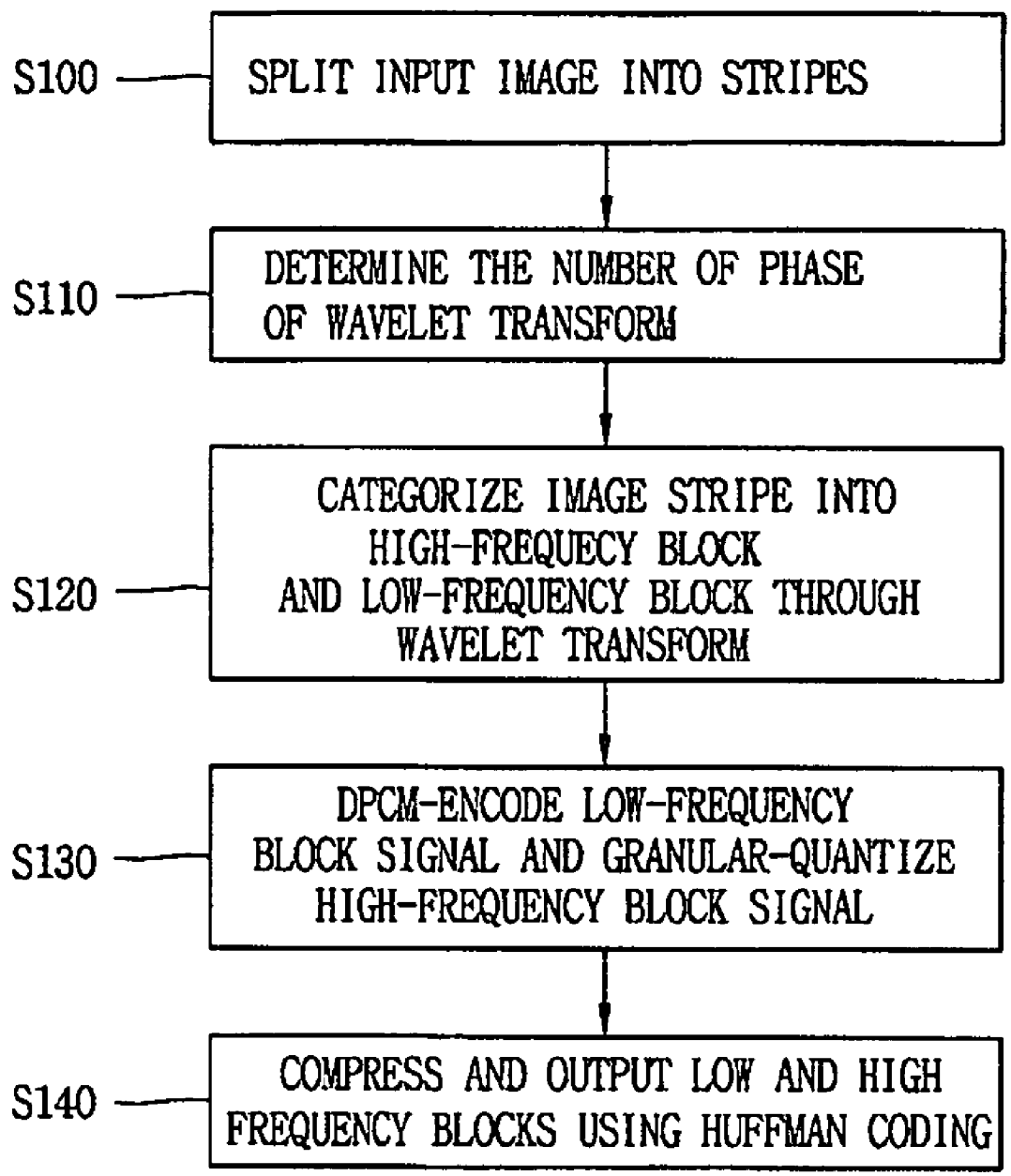
FIG. 5 is a drawing illustrating how to encode an image for a mobile telecommunication handset according to the present invention.

FIG. 5 shows a process of encoding an image for a mobile telecommunication handset according to the present invention.

Figure 6A:
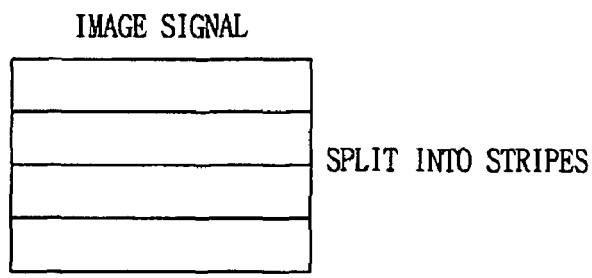
FIG. 6A is a drawing illustrating a configuration of image stripes according the present invention.

The stripe splitter 10, as shown in FIG. 6A, splits an input image into stripe blocks to reduce a memory capacity necessary to process the input image (S100). A width of the stripe block is the same as that of the input image and a length of the stripe block corresponds to the number of pixels with a certain size. Therefore, the number of stripe blocks per an input image depends on how large the input image is.

According to the present invention, the image is encoded on a stripe basis and therefore the memory capacity is reduced which is necessary to encode the image.

The color stripe transformer 20 transforms the input image stripes from RGB color space to YUV color space. The YUV color method here is to divide the image into luminance (Y) and chrominance (U.V) representing a horizontal synchronous signal and a vertical synchronous signal, respectively. The YUV color method makes it possible to express more color tunes with less color information, but makes separation and transmittance of the color tunes insufficient compared to the RGB color method.

The stripe encoder 30 determines the number of the phase of wavelet transform depending on the size of the input image (S110). The stripe-encoder 30 transforms the image stripe block transformed into YUV color space into wavelet blocks depending on the determined number of the phase of wavelet transform encodes the low-frequency wavelet block with the DPCM process, and makes a granular quantization of the high-frequency wavelet block (S120/S130). The stripe-encoder 30 encodes the DPCM-encoded low-frequency wavelet block and the granular-quantized high-frequency wavelet block, using Huffman code (S140).

The stripe-state storage unit 40 stores information which was used when encoding the stripe and provides the stored information to the stripe encoder 30 for the stripe encoder 30 to use the stored information again when encoding the stripe next time.

Below is described the operation of the stripe encoder 30 referring to FIG. 2.

The determination unit 31 of the stripe encoder 30 determines the number of the phase of two-dimensional wavelet transform depending on the size of the input image and provides the determined number of the phase of two-dimensional wavelet transform to the stripe wavelet transformer 32 and the initiation unit 33 initiating the quantization unit provided to wavelet coefficients. The initiation of the quantization unit is performed based on the determined number of the phase and the quantization level input by a user. The quantization unit provided to quantize the wavelet coefficients includes the coefficient-quantization unit 342 of the DPCM encoder 34 and the significant sub-block quantization unit 353 of the quantization unit 35.

The stripe wavelet transformer 32 performs a 2-dimensional wavelet transform of the image stripe block output from the color stripe transformer 20, through the use of lifting scheme, depending on the number of the phase determined by the determination unit 31 and the stripe-state information provided by the stripe-state storage unit 40. At this point, the use of the lifting scheme makes it quicker to perform the wavelet transform.

Below is described the number of the phase of wavelet transform.

Figure 6B:
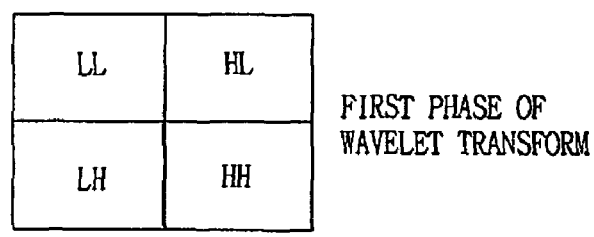
FIG. 6B is a drawing illustrating a configuration of image stripes which experienced the first phase of wavelet transform according to the present invention.

The number of the phase of wavelet transform means the number of times when the image stripe block is transformed into wavelet. That is, if the number of the phase is 1, then the image stripe block is transformed into wavelet in the first phase of wavelet transform. As shown in FIG. 6B, one image stripe block is split into LL, LH, HL, and HH blocks in the first phase of wavelet transform.

Figure 6C:
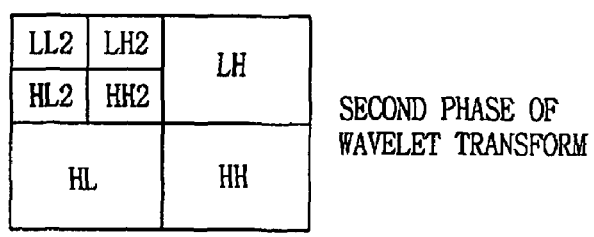
FIG. 6C is a drawing illustrating a configuration of image stripes which experienced the second phase of wavelet transform according to the present invention.
Figure 6D:
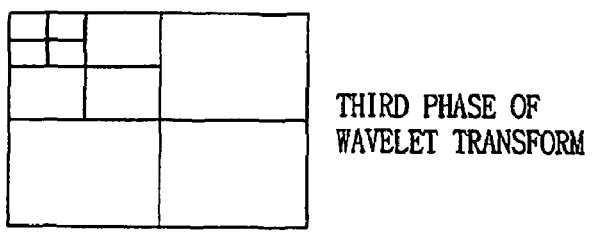
FIG. 6D is a drawing illustrating a configuration of image stripes which experienced the third phase of wavelet transform according to the present invention.

If the number of the phase is 2, then the first phase wavelet-transformed LL block is one more time transformed into wavelet blocks. Therefore, one image stripe block of the second phase wavelet-transformed stripe blocks, as shown in FIG. 6C, is divided into LL2, LH2, HL2, HH2, LH, HL, and HH blocks. The LL2 block is categorized into the low-frequency wavelet block and the LH2, HL2, HH2, LH, HL, HH blocks are categorized into the high-frequency wavelet blocks.

If the number of the phase is 3, then the LL2 block which was obtained by the second phase wavelet-transform is one more time transformed into wavelet blocks. One of the third phase wavelet-transformed stripe blocks, is divided into LL3, LH3, HL3, HH3, LH2, HL2, HH2, LH, HL, and HH blocks. The LL3 block is output to the quantization unit 35.

The larger the number of the phase is, the higher the compression rate is due to concentration of energy of the pure low-frequency bandwidth and the longer the time for compression is due to a large amount of the computing load. Therefore, the number of the phase of wavelet transform may be limited to the proper number by experiment. The number of the phase according to the present invention is 3 to 5, but limited to this. The number of the phase may vary depending on the size of the image.

The low-frequency wavelet block of the image stripe block which was transformed by the stripe wavelet transformer 32 is output to the DPCM encoder 34 and the high-frequency wavelet block is output to the quantization unit 35.

The quantization unit 35 divides the high-frequency wavelet block output from the stripe wavelet transformer 32 into the sub-blocks and the sub-blocks, in turn, are divided into the significant sub-blocks and the insignificant sub-blocks. The quantization unit 35 outputs the sub-block types to the bit matrix encoder 36 in a bit matrix form and outputs the significant sub-blocks to the entropy encoder 37 after quantizing the significant sub-blocks based on the quantization level output from the initiation unit 33. The operation of the quantization unit 35 is below described.

The DPCM encoder 34 encodes the low-frequency wavelet block output from the stripe wavelet transformer 32. The DPCM process, which is based on a combination of the block-optimal-linear prediction and the reference prediction, is employed during the encoding of the low-frequency wavelet block. The operation of the DPCM encoder 34 is below described.

The bit matrix encoder 36 encodes the bit matrix of sub-block types output from the high-frequency sub-block classification unit 352 of the quantization unit 35 and the bit matrix of the quantized prediction error data output from the DPCM encoder 34, using the run-length method.

The entropy encoder 37 compresses the quantized low-frequency coefficients (quantized LPC) output from the DPCM encoder 34 and the quantized high-frequency coefficients (quantized high-frequency sub-blocks) output from the quantization unit 35, using the entropy coding and outputs the final compressed data.

Referring to FIG. 3, the operation of the quantization unit 35 is below described.

The sub-block splitter 351 of the quantization unit 35 splits the high-frequency wavelet blocks output from the stripe wavelet transformer 32 into the square (2×2) sub-blocks, depending on the type of the high-frequency block. The high-frequency sub-block classification unit 352 classifies the sub-blocks into the significant sub-blocks and the insignificant sub-blocks and outputs the types of the sub-blocks to the bit matrix encoder 36 in a form of bit matrix. The significant sub-block quantization unit 353 makes a scalar quantization of the significant sub-blocks and setting the insignificant sub-blocks to "0." The significant sub-block quantization unit 353 outputs the quantized high-frequency blocks (especially, coefficients) to the entropy encoder 37.

Referring to FIG. 4, the operation of the DPCM encoder 34 is below described.

As shown in FIG. 4, the linear prediction unit 341 of the DPCM encoder 34 calculates the optimal linear prediction coefficients (LPC) of the low-frequency wavelet block output from the stripe wavelet transformer 32. the coefficient-quantization unit 342 makes a scalar quantization of the LPC using the quantized matrix output from the initiation unit 33. The scalar-quantized LPCs are output to the entropy encoder 37.

The linear prediction unit 343, as stated in Formula 1, calculates the linear prediction value of the current pixel using the quantized LPCs (a, b, c).

$$Px = a \cdot L + b \cdot Up + c \cdot UpL \qquad \text{(Formula 1)}$$

where, Px is the linear prediction value, a, b and c are the linear prediction coefficients of which relational expression is a+b+c=1, L is the value of a pixel adjacent to the left side of the Px, Up is the value of a pixel adjacent to the upper side of Px, and UpL is the value of a pixel adjacent to the upper left side of Px.

The smoothness tester 344 tests if the vicinity of a pixel (Px) to be soon encoded is smooth using the low-frequency block output from the stripe wavelet transformer 32 and provides the test result to the reference corrector 345. Formula 2 is employed in the smoothness testing.

$$\max(\text{abs}(Up-L), \text{abs}(UpL-L), \text{abs}(UpR-L)) < \text{Threshold} \qquad \text{(Formula 2)}$$

where (abs(Up−L)) is a absolute value of a difference in value between a value (Up) of a pixel adjacent to the upper side of the pixel Px and a value (L) of a pixel adjacent to the left side of the pixel Px, (abs(UpL−L) is a absolute value of a difference in value between a value (UpL) of a pixel adjacent to the upper left side of the pixel Px and the value value (L) of a pixel adjacent to the left side of the pixel Px, and (abs(UpR−L)) is a absolute value of a difference in value between a value (UpR) of a pixel adjacent to the upper right of the pixel Px, the value value (L) of a pixel adjacent to the left side of the pixel Px, and Threshold is a reference value which serve as a basis for determining the level of smoothness. The smoothness tester 344 determines it as "smooth" when the largest of the three absolute values is less than threshold, and determines it as "not smooth" when the largest of the three absolute values is not less than threshold.

The smoothness tester 344, when the current pixel to be encoded is not smooth, outputs a first control signal, in order for the reference corrector 345 to correct the current pixel linear prediction value. The reference corrector 345 corrects the current pixel linear prediction value using a spatial similarity according to the first control signal. The smoothness tester 344, when the current pixel to be encoded is smooth, outputs a second control signal, in order for the reference corrector 345 to bypass the current pixel linear prediction value. The reference corrector 345 bypasses the current pixel linear prediction value to the subtracting unit 346, according to the second control signal. The reference corrector 345 corrects or bypasses the current pixel linear prediction value output from the linear prediction unit 343, depending on the testing result of the smoothness tester 344. Thus, a low-resolution image can be encoded effectively and with good quality.

The subtracting unit 346 calculates a difference between the pixel (current pixel) of the low-frequency wavelet block output from the stripe wavelet transformer 32 and the pixel prediction value output from the reference corrector 345 and outputs the prediction error. The prediction error quantization unit 347 makes a scalar quantization of the prediction error. The scalar-quantized prediction error data constitutes the bit matrix including the significance bits and the quantized values (set of sign and absolute value). The bit matrix is output to the bit matrix encoder 36.

The block low-frequency error corrector 348 corrects the low-frequency component of the scalar-quantized block error.

The DPCM encoder 34 is largely divided into 3 parts, the pixel-prediction-value calculating part (the linear prediction unit 341, the coefficient-quantization unit 342, the linear prediction unit 343, the smoothness tester 344 and the reference corrector 345), the part generating the difference in value (prediction error) between the pixel prediction value and the value of the pixel to be soon encoded (the subtracting unit 346), the difference-value quantization part (the prediction error quantization unit 347 and a block low-frequency error corrector 348). Thus, the DPCM encoder 34 makes it possible to improve the efficiency of compression of the image data, by adaptively employing the linear prediction method and the prediction method using a spatial similarity to the image.

As is above described, according to the present invention, the image is divided into the stripe blocks and the number of the phase of wavelet transform is determined depending on the size of the image. The divided image stripe block is wavelet-transformed depending to the determined number of the phase. The wavelet-transformed high-frequency components is granular-quantized and the wavelet-transformed low-frequency components is DPCM-encoded. Thus, computing load and memory capacity can be lessened, maintaining the image of good quality in the mobile telecommunication handset.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for encoding an image for a mobile telecommunication handset, the apparatus comprising:
    a stripe splitter configured to split the image into stripes, each of the stripes divided into at least two frequency parts; and
    an encoder configured to encode the stripes, the encoder comprising:
        a determination unit configured to determine a number of a phase of a wavelet transform of the stripes according to a size of the image;
        a stripe wavelet transformer configured to wavelet transform the stripes according to the determined number of the phase of the wavelet transform and to output wavelet-transformed low-frequency wavelet blocks and wavelet-transformed high-frequency wavelet blocks;
        a low-frequency block encoder configured to encode the wavelet-transformed low-frequency wavelet blocks;
        a high-frequency block encoder configured to quantize the wavelet-transformed high-frequency wavelet blocks;
        a quantization unit configured to quantize wavelet coefficients in the low-frequency block encoder and the high-frequency block encoder;
        an initiation unit configured to initialize the quantization unit based on the determined number of the phase;
        a bit matrix encoder configured to encode a bit matrix obtained from the high-frequency block encoder and the low-frequency block encoder; and
        an entropy encoder configured to compress quantized low-frequency coefficients output from the low-frequency block encoder and quantized high-frequency coefficients output from the high-frequency block encoder using entropy coding and output compressed data,
        wherein a width of the stripes is the same as a width of the image,
        wherein a length of the stripes corresponds to a sum of lengths of pixels, and
        wherein a number of the stripes of the image is determined according to a size of the image.

2. The apparatus of claim 1, further comprising a color stripe transformer configured to transform the stripes from RGB (red-green-blue) color space to YUV color space and output the stripes in the YUV color space to the encoder.

3. The apparatus of claim 1, wherein encoding the wavelet-transformed low-frequency wavelet blocks comprises using a DPCM (Differential Pulse Coding Modulation) method.

4. The apparatus of claim 1, wherein the quantizing of the high-frequency wavelet blocks is performed using a granular quantization.

5. The apparatus of claim 1, wherein the entropy encoder compresses the quantized low-frequency coefficients and the quantized high-frequency coefficients using Huffman coding.

6. The apparatus of claim 1, wherein the high-frequency block encoder comprises:
    a sub-block splitter configured to split the wavelet-transformed high-frequency wavelet blocks into sub-blocks;
    a high-frequency sub-block classification unit configured to categorize the sub-blocks into significant sub-blocks, insignificant sub-blocks and output types of the sub-blocks in a bit matrix form; and
    a significant sub-block quantization unit configured to perform a scalar quantization of the significant sub-blocks and output the scalar-quantized significant sub-blocks.

7. The apparatus of claim 1, wherein the low-frequency block encoder comprises:
    a block linear prediction unit configured to calculate optimal linear prediction coefficients of the wavelet-transformed low-frequency wavelet blocks;
    a coefficient quantization unit configured to quantize the optimal linear prediction coefficients and output quantized linear prediction coefficients to the entropy encoder;
    a pixel linear prediction unit configured to calculate a linear prediction value of a current pixel to be encoded using the quantized linear prediction coefficients;
    a smoothness tester configured to test if a vicinity of the current pixel is smooth;
    a reference corrector configured to correct the linear prediction value of the current pixel according to control of the smoothness tester when the vicinity of the current pixel is not smooth;
    a subtraction unit configured to calculate a difference between a current pixel value of the wavelet-transformed low-frequency wavelet blocks and the linear prediction value from the reference corrector to output a prediction error based on the difference; and
    a prediction error quantization unit configured to quantize the prediction error and output the quantized prediction error in a bit matrix form.

8. The apparatus of claim 7, wherein the reference corrector is further configured to bypass the linear prediction value of the current pixel when the vicinity of the current pixel is smooth.

9. The apparatus of claim 7, wherein the low-frequency block encoder further comprises a block low-frequency error corrector configured to correct a low-frequency component of a quantized block error.

10. A method for encoding an image for a mobile telecommunication handset, the method comprising:
    receiving the image via an input device;
    splitting the image, via a stripe splitter, into stripes; and
    encoding the stripes via an encoder by:
        determining a number of a phase of a wavelet transform of the stripes according to a size of the image;
        performing, via a stripe wavelet transformer, a wavelet transform of the stripes according to the determined number of the phase of the wavelet transform and outputting wavelet-transformed low-frequency wavelet blocks and wavelet-transformed high-frequency wavelet blocks;
        encoding, via a low-frequency block encoder, the wavelet-transformed low-frequency wavelet blocks;
        encoding, via a high-frequency block encoder, the wavelet-transformed high-frequency wavelet blocks;
        initializing a quantization unit based on at least the determined number of the phase, the quantization unit configured to quantize wavelet coefficients in the low-frequency block encoder and the high-frequency block encoder;
        encoding, via a bit matrix encoder, a bit matrix obtained from the high-frequency block encoder and the low-frequency block encoder; and
        compressing, via an entropy encoder, quantized low-frequency coefficients output from the low-frequency block encoder and quantized high-frequency coefficients output from the high-frequency block encoder using entropy coding and outputting compressed data,
    wherein a width of the stripes is the same as a width of the image,
    wherein a length of the stripes corresponds to a sum of lengths of pixels, and
    wherein a number of stripes of the image is determined according to a size of the image.

11. The method of claim 10, further comprising transforming the stripes from RGB (red-green-blue) color space to YUV color space before performing the wavelet transform of the stripes.

12. The method of claim 10, wherein the encoding of the wavelet-transformed high-frequency wavelet blocks comprises a granular quantization.

13. The method of claim 10, wherein the encoding of the wavelet-transformed high-frequency wavelet blocks comprises:
    splitting the wavelet-transformed high-frequency wavelet blocks into sub-blocks;
    categorizing the sub-blocks into significant sub-blocks and insignificant sub-blocks and outputting types of the sub-blocks in a form of bit matrix; and
    performing a scalar quantization of the significant sub-blocks and outputting the scalar-quantized significant sub-blocks.

14. The method of claim 10, wherein encoding the wavelet-transformed low-frequency wavelet blocks comprises a DPCM (Differential Pulse Coding Modulation) encoding.

15. The method of claim 10, wherein encoding the wavelet-transformed low-frequency wavelet blocks comprises:
    calculating optimal linear prediction coefficients of the wavelet-transformed low-frequency wavelet blocks;
    quantizing the optimal linear prediction coefficients to generate quantized linear prediction coefficients;
    calculating a linear prediction value of a current pixel to be encoded using the quantized linear prediction coefficients;
    testing if a vicinity of the current pixel is smooth;
    correcting the linear prediction value of the current pixel when the vicinity of the current pixel is not smooth;
    calculating a difference between a current pixel value of the wavelet-transformed low-frequency wavelet block and the corrected linear prediction value of the current pixel and outputting a prediction error based on the difference; and
    quantizing the prediction error and outputting the quantized prediction error in a bit matrix form.

* * * * *